(12) United States Patent
Logan et al.

(10) Patent No.: US 8,112,524 B2
(45) Date of Patent: Feb. 7, 2012

(54) RECOMMENDING MOVING RESOURCES IN A PARTITIONED COMPUTER

(75) Inventors: Bryan Mark Logan, Rochester, MN (US); Daniel Gerard Thornton, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1424 days.

(21) Appl. No.: 11/623,203

(22) Filed: Jan. 15, 2007

(65) Prior Publication Data

US 2008/0172672 A1    Jul. 17, 2008

(51) Int. Cl.
  *G06F 15/173* (2006.01)
(52) U.S. Cl. ........ 709/226; 709/217; 709/221; 709/224; 709/228; 714/15; 711/170
(58) Field of Classification Search ........... 711/153–173
  See application file for complete search history.

(56) References Cited

U.S. PATENT DOCUMENTS

| | | | | |
|---|---|---|---|---|
| 6,820,217 | B2* | 11/2004 | Mock et al. | 714/15 |
| 2002/0129127 | A1* | 9/2002 | Romero et al. | 709/220 |
| 2002/0156824 | A1* | 10/2002 | Armstrong et al. | 709/104 |
| 2002/0156939 | A1* | 10/2002 | Armstrong et al. | 709/400 |
| 2003/0069972 | A1* | 4/2003 | Yoshimura et al. | 709/226 |
| 2003/0159086 | A1* | 8/2003 | Arndt | 714/25 |
| 2004/0003063 | A1* | 1/2004 | Ashok et al. | 709/221 |
| 2004/0139287 | A1* | 7/2004 | Foster et al. | 711/153 |
| 2004/0215911 | A1* | 10/2004 | Ouren et al. | 711/170 |
| 2004/0221019 | A1* | 11/2004 | Swildens et al. | 709/217 |
| 2004/0236852 | A1* | 11/2004 | Birkestrand et al. | 709/226 |
| 2005/0044228 | A1* | 2/2005 | Birkestrand et al. | 709/226 |
| 2005/0198102 | A1* | 9/2005 | Hahn et al. | 709/200 |
| 2006/0161753 | A1* | 7/2006 | Aschoff et al. | 711/170 |
| 2006/0174087 | A1* | 8/2006 | Hashimoto et al. | 711/173 |
| 2006/0212870 | A1* | 9/2006 | Arndt et al. | 718/104 |
| 2007/0079102 | A1* | 4/2007 | Armstrong et al. | 711/173 |
| 2008/0155243 | A1* | 6/2008 | Diep et al. | 713/2 |

* cited by examiner

Primary Examiner — Wing Chan
Assistant Examiner — Razu Miah
(74) Attorney, Agent, or Firm — Owen J. Gamon

(57) ABSTRACT

In an embodiment, a partition is discovered that transferred more than a threshold amount of data between the partition and a first resource. A determination is made that the partition transferred more than a threshold amount of data with a second resource. A determination is made that the data path distance between the first and second resources is more than a threshold. A third location is found that is open and a determination is made that the data path distance between the first resource and the third location is less than a threshold, and in response, a recommendation is made to move the second resource to the third location.

15 Claims, 11 Drawing Sheets

| RESOURCE CONFIGURATION DATA | | | 236 |
|---|---|---|---|
| RESOURCE (385) | LOCATION (390) | DATA PATH DISTANCE BETWEEN RESOURCES (395) | |
| CPU A | MCM A | 0, 1, 2, 2, 2, 2, 2, 2, 3, 1, 3, 1, 3, 5, 3, 5 | 305 |
| CPU B | MCM A | 1, 0, 2, 2, 2, 2, 2, 2, 3, 3, 3, 3, 5, 5, 5, 5 | 310 |
| CPU C | MCM B | 2, 2, 0, 2, 1, 2, 2, 2, 5, 5, 5, 5, 5, 5, 5, 5 | 315 |
| CPU D | MCM D | 2, 2, 2, 0, 2, 2, 2, 1, 5, 5, 5, 5, 3, 3, 3, 3 | 320 |
| MEMORY A - 32 GB | MCM B | 2, 2, 1, 2, 0, 2, 2, 2, 5, 5, 5, 5, 5, 5, 5, 5 | 325 |
| MEMORY B - 32 GB | MCM C | 2, 2, 2, 2, 2, 0, 1, 2, 5, 5, 5, 5, 5, 5, 5, 5 | 330 |
| MEMORY C - 64 GB | MCM C | 2, 2, 2, 2, 2, 1, 0, 2, 5, 5, 5, 5, 5, 5, 5, 5 | 335 |
| MEMORY D - 64 GB | MCM D | 2, 2, 2, 1, 2, 2, 2, 0, 5, 5, 5, 5, 3, 3, 3, 3 | 340 |
| SLOT A - TERMINAL I/F | MCM A | 3, 3, 5, 5, 5, 5, 5, 5, 0, 2, 4, 2, 6, 8, 6, 7 | 345 |
| SLOT B | MCM A | 1, 1, 3, 3, 3, 3, 3, 3, 2, 0, 2, 1, 4, 6, 4, 5 | 350 |
| SLOT C - STORAGE I/F | MCM A | 3, 3, 5, 5, 5, 5, 5, 5, 4, 2, 0, 2, 6, 8, 6, 7 | 355 |
| SLOT D | MCM A | 1, 1, 3, 5, 3, 3, 3, 3, 3, 2, 3, 0, 4, 6, 4, 5 | 360 |
| SLOT E | MCM D | 3, 3, 3, 1, 3, 3, 3, 1, 6, 4, 6, 4, 0, 2, 1, 1 | 365 |
| SLOT F - NETWORK I/F | MCM D | 5, 5, 5, 3, 5, 5, 5, 3, 8, 6, 8, 6, 2, 0, 2, 2 | 370 |
| SLOT G | MCM D | 3, 3, 3, 1, 3, 3, 3, 1, 6, 4, 6, 4, 2, 2, 0, 2 | 375 |
| SLOT H - AUXILIARY DEVICE I/F | MCM D | 4, 4, 4, 3, 4, 4, 4, 2, 7, 5, 7, 5, 1, 3, 1, 0 | 380 |

FIG. 3

| | | | | |
|---|---|---|---|---|
| | | RESOURCE ALLOCATION DATA | | 238 |
| 415 | 420 | 425 | 430 | |
| LP ID | RANK | ALLOCATED RESOURCES | LOCATION OF ALLOCATED RESOURCES | |
| LP A | 2 | MEMORY A 32GB, CPU C, NETWORK ADAPTER, DISK D 200GB | MCM C, MCM B, SLOT H, SLOT C | 405 |
| LP B | 1 | MEMORY C 32GB, CPU A, CPU D, DISK A 400GB | MCM D, MCM A, MCM B, SLOT C | 410 |

FIG. 4

PARTITION UTILIZATION HISTORY DATA 240-1

| LOGICAL PARTITION ID | CPU UTILIZATION | AMOUNT OF MEMORY USED | AMOUNT OF DATA TRANSFERRED TO/FROM I/O DEVICES |
|---|---|---|---|
| LP A | 85% | 2.3 GB | 86.5 GB, NETWORK; 14.5 GB, DISK D |
| LP B | 75% | 3.3 GB | 126.5 GB, DISK A |

FIG. 5

DYNAMIC RESOURCE ALLOCATION HISTORY DATA 240-2

| RESOURCE | LOCATION | SOURCE PARTITION ID | DESTINATION PARTITION ID | TIME OF CHANGE |
|---|---|---|---|---|
| 16 GB | MCM D | LP A | LP B | 11:30 |
| CPU C | MCM B | LP B | LP A | 11:29 |
| 16 GB | MCM D | LP B | LP A | 11:24 |

FIG. 6

RECOMMENDING MOVING RESOURCES IN A PARTITIONED COMPUTER

FIELD

An embodiment of the invention generally relates to computer systems. In particular, an embodiment of the invention generally relates to recommending the moving of resources in a logically-partitioned computer system.

BACKGROUND

Some computer systems implement the concept of logical partitioning, in which a single physical computer operates essentially like multiple and independent virtual computers, referred to as logical partitions, with the various resources in the physical computer—e.g., processors, memory, and I/O (input/output devices)—allocated among the various logical partitions. Each logical partition executes a separate operating system, and from the perspective of users and of the software applications executing in the logical partition, operates as an independent computer. The partitions operate under the control of a partition manager or hypervisor.

A fundamental challenge in logically-partitioned computers is to properly allocate the resources of the physical computer between the logical partitions, in order to obviate the problem of one partition experiencing a surplus of unused resources with another partition experiencing a paucity of resources, which causes performance problems. In an attempt to address these problems, developers of logically-partitioned computers have created hypervisor techniques for changing the allocation of resources to partitions, in response to the changing needs of the partitions.

But, current hypervisors do not respond well to problems caused by a sub-optimal physical configuration or layout of the resources in the computer. For example, if a partition transfers a large amount of data from a storage device to a network, and the hypervisor has allocated adequate storage, network, processor, and memory resources, the partition may still experience performance problems if the storage and network resources are located on different I/O buses, which causes delay in the transfer of data. The partition might experience better performance if all of its resources were in close proximity to each other, but current hypervisors are unable to account for the location of resources when performing allocation.

Thus, a better technique is needed for allocating resources to logical partitions in computer systems.

SUMMARY

A method, apparatus, system, and signal-bearing medium are provided. In an embodiment, a partition is discovered that transferred more than a threshold amount of data between the partition and a first resource. A determination is also made that the partition transferred more than a threshold amount of data between the partition and a second resource. A determination is further made that the data path distance between the first and second resources is more than a threshold distance. A third location is found that is open and a determination is made that the data path distance between the first resource and the third location is less than a threshold distance, and in response, a recommendation is made to move the second resource to the third location.

In an embodiment, a current resource is selected whose allocation was changed between partitions more than a threshold amount, and an equivalent resource is selected whose location is within a threshold distance of the partitions, and the equivalent resource is allocated to the partitions instead of the current resource.

In an embodiment, a first resource is discovered that is allocated to a current partition that transferred an amount of data to the first resource that is less than a threshold amount, and a second resource is found that is also allocated to the current partition. A third location is found that is open, where a data path distance from the third location to the second resource is less than a data path distance from the first resource to the second resource. If the data path distances between the first resource and all other resources allocated to the current partition are more than a threshold distance, a recommendation is made to move the first resource to the third location. If the data path distances between the first location and the locations of all of the other resources are not more than a threshold distance, a recommendation is made to deallocate the first resource from the current partition.

In this way, computers may be configured and resources may be allocated to partitions in a way that increases performance.

BRIEF DESCRIPTION OF THE DRAWINGS

Various embodiments of the present invention are hereinafter described in conjunction with the appended drawings:

FIG. 3 depicts a block diagram of an example data structure for resource configuration data, according to an embodiment of invention.

FIG. 4 depicts a block diagram of an example data structure for resource allocation data, according to an embodiment of invention.

FIG. 5 depicts a block diagram of an example data structure for partition utilization history data, according to an embodiment of invention.

FIG. 6 depicts a block diagram of an example data structure for dynamic resource allocation history data, according to an embodiment of invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
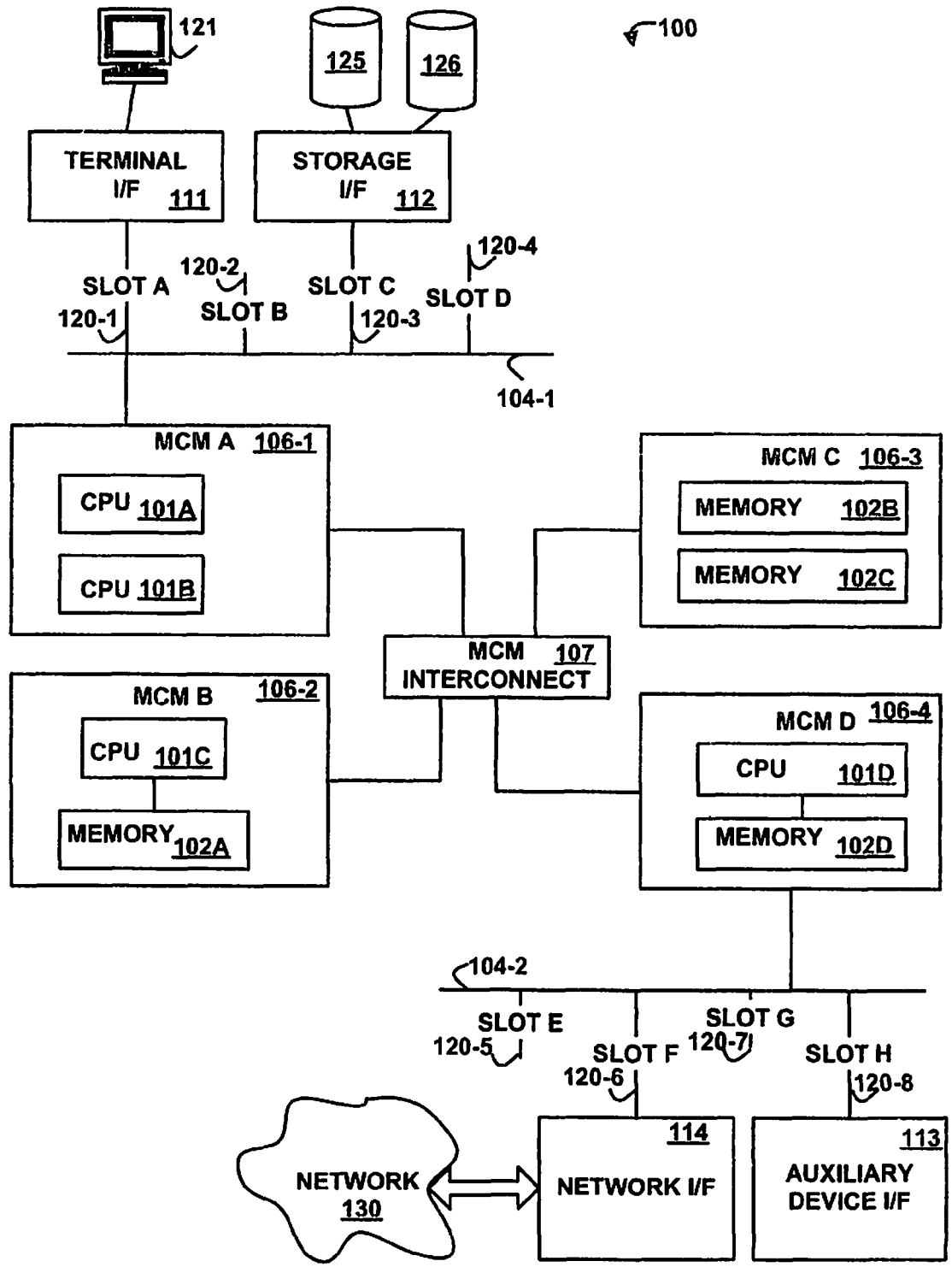
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. The major components of the computer system 100 include multiple MCMs (Multi-Chip Modules) A 106-1, B 106-2, C 106-3, and D 106-4, which are interconnected via an MCM interconnect 107, which may be a bus. The MCM 106-1 is connected to an I/O bus 104-1, and the MCM 106-4 is connected to an I/O bus 104-2, but any number of I/O buses may be present, which may be connected to any MCM.

Each MCM includes one or more processors and/or one or more memory devices. For example, the MCM 106-1 includes a CPU (Central Processing Unit) 101A and a CPU 101B. The MCM 106-2 includes a CPU 101C and memory 102A. The MCM 106-3 includes memory 102B and memory 102C. The MCM 106-4 includes a CPU 101D and memory 102D.

The CPUs 101A, 101B, 101C, and 101D are general-purpose programmable central processing units. Each CPU 101A, 101B, 101C, and 101D executes instructions stored in the main memory 102A, 102B, 102C, and/or 102D and may include one or more levels of on-board cache. As illustrated in FIG. 1, the memory 102A, 102B, 102C, and/or 102D are distributed and may be associated with different CPUs or sets of CPUs 101A, 101B, 101C, and/or 101D at different times, which is known as a non-uniform memory access (NUMA) computer architecture. Thus, in various embodiments, the CPUs 101A, 101B, 101C, and/or 101D may access data and execute instructions from any, some, or all of the memory 102A, 102B, 102C, and/or 102D.

The I/O buses 104-1 and 104-2 include various connection slots or connectors, or I/O bus interface units, such as the respective slots 120-1, 120-2, 120-3, 120-4, 120-5, 120-6, 120-7, and 120-8. The I/O buses 104-1 and 104-2 may implement, e.g., an industry standard PCI (Peripheral Component Interconnect) bus, a serial bus, a parallel bus, a USB (Universal Serial Bus) bus, a Firewire bus, a SCSI (Small Computer System Interface) bus, or any other appropriate wired or wireless bus technology.

The slots 120-1, 120-2, 120-3, 120-4, 120-5, 120-6, 120-7, and 120-8 may be connected to and communicate with I/O interface units 111, 112, 113, and 114, which are also known as I/O processors (IOPs) or I/O adapters (IOAs). For example, the slot 120-1 is connected to the terminal interface unit 111, the slot 120-3 is connected to the storage interface unit 112, the slot 120-6 is connected to the network interface unit 114, and the slot 120-8 is connected to the auxiliary device interface unit 113. The slots 120-2, 120-4, 120-5, and 120-7 are open or available, meaning that no resource is currently connected to the respective slot.

The I/O interface units support communication with a variety of storage and I/O devices. For example, the terminal interface unit 111 supports the attachment of one or more user terminals 121. The user terminal 121 may include a video display device, a keyboard, a mouse or other pointing device, speakers, a microphone, a speech recognition device, or any other mechanism for sending output to and/or receiving input from a user. The storage interface unit 112 supports the attachment of one or more direct access storage devices (DASD) 125 and 126 (which are typically rotating magnetic disk drive storage devices, although they could alternatively be other devices, including arrays of disk drives configured to appear as a single large storage device to a host). The contents of the memory 102A, 102B, 102C, and 102D may be stored to and retrieved from the direct access storage devices 125 and 126.

The auxiliary device interface unit 113 provides an interface to any of various other input/output devices or devices of other types, such as printers or fax machines, but in other embodiment many other such devices may exist, which may be of differing types. The network interface 114 provides one or more communications paths from the computer system 100 to other digital devices and computer systems; such paths may include, e.g., one or more networks 130.

In various embodiments, the computer system 100 may be a multi-user "mainframe" computer system, a single-user system, or a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

Figure 2:
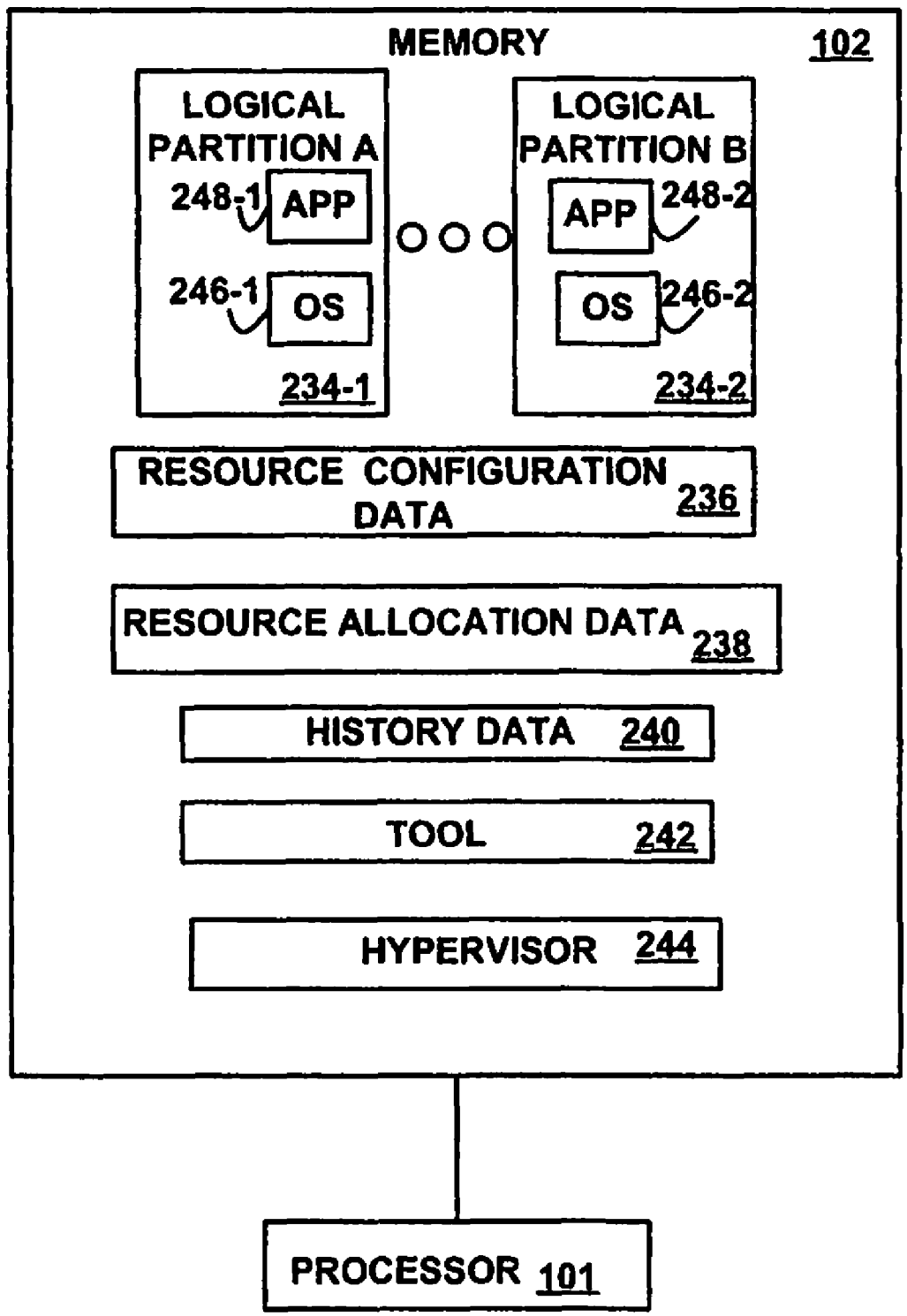
FIG. 2 depicts a block diagram of selected components of the example system, according to an embodiment of invention.

FIG. 2 depicts a block diagram of selected components of the example system, according to an embodiment of invention. FIG. 2 illustrates memory 102 connected (directly or indirect) to a processor 101. The processor 101 generically refers to the CPUs 101A, 101B, 101C, and 101D. The memory 102 generically refers to the memory 102A, 102B, 102C, and 102D.

The memory 102 is a random-access semiconductor memory for storing or encoding data and programs. The memory 102 is conceptually a single monolithic entity, but in practice may be implemented as a more complex arrangement, such as a hierarchy of caches and other memory devices at different levels. For example, memory may exist in multiple levels of caches, and these caches may be further divided by function, so that one cache holds instructions while another holds non-instruction data, which is used by the processor 101.

The memory 102 is illustrated as storing or encoding the primary software components and data utilized in implementing a logically-partitioned computing environment on the computer 100, including multiple logical partitions 234-1 and 234-2 managed by a partition manager or hypervisor 244. Although the partition 234-1, the partition 234-2, and the hypervisor 244 are illustrated as being contained within the memory 102 in the computer system 100, in other embodiments some or all of them may be on different computer systems and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partition 234-1, the partition 234-2, and the hypervisor 244 are illustrated as residing in the memory 102, these elements are not necessarily all completely contained in the same storage device at the same time.

Each of the logical partitions 234-1 and 234-2 utilizes a respective operating system 246-1 and 246-2, which controls the primary operations of the respective logical partition 234-1 and 234-2 in the same manner as the operating system of a non-partitioned computer. For example, one or both of the operating systems 246-1 and 246-2 may be implemented using the i5/OS operating system available from International Business Machines Corporation of Armonk, N.Y., but in other embodiments one or both of the operating systems 246-1 and 246-2 may be Linux, AIX, UNIX, Microsoft Windows, or any appropriate operating system. Also, some or all of the operating systems 246-1 and 246-2 may be the same or different from each other. Any number of logical partitions 234-1 and 234-2 may be supported as is well known in the art, and the number of the logical partitions 234-1 and 234-2 resident at any time in the computer 100 may change dynamically as partitions are added or removed from the computer 100.

Each of the logical partition 234-1 and 234-2 executes in a separate, or independent, memory space, and thus each logical partition 234-1 and 234-2 acts much the same as an independent, non-partitioned computer from the perspective of each application 248-1 and 248-2 that executes in each respective logical partition. As such, user applications typically do not require any special configuration for use in a partitioned environment. Given the nature of logical partitions 234-1 and 234-2 as separate virtual computers, it may be desirable to support inter-partition communication to permit the logical partitions to communicate with one another as if the logical partitions were on separate physical machines. As such, in some implementations it may be desirable to support an un-illustrated virtual local area network (LAN) adapter associated with the hypervisor 244 to permit the logical partitions 234-1 and 234-2 to communicate with one another via a networking protocol such as the Ethernet protocol. In another embodiment, the virtual network adapter may bridge to a physical adapter, such as the network interface adapter 114. Other manners of supporting communication between partitions may also be supported consistent with embodiments of the invention.

Although the hypervisor 244 is illustrated as being stored within the memory 102, in other embodiments, all or a portion of the hypervisor 244 may be implemented in firmware or hardware. The hypervisor 244 may perform low-level partition management functions, such as page table management. The hypervisor 244 may also perform higher-level partition management functions, such as creating and deleting partitions, concurrent I/O maintenance, allocating and deallocating processors, memory and other hardware or software resources to the various partitions 234-1 and 234-2.

The hypervisor 244 statically and/or dynamically allocates to each logical partition 234-1 and 234-2 a portion of the available resources in computer 100. For example, each logical partition 234-1 and 234-2 may be allocated one or more of the processors 101 and/or one or more hardware threads, as well as a portion of the available memory space. The logical partitions 234-1 and 234-2 can share specific software and/or hardware resources such as the processors 101, such that a given resource may be utilized by more than one logical partition. In the alternative, software and hardware resources can be allocated to only one logical partition 234-1 and 234-2 at a time. Additional resources, e.g., mass storage, backup storage, user input, network connections, and the I/O adapters, are typically allocated to one or more of the logical partitions 234-1 and 234-2. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used.

The memory 102 further stores or encodes the resource configuration data 236, the resource allocation data 238, the history data 240, and the tool 242. The resource configuration data 236 describes the configuration or physical layout of the resources of the computer system 100, including the physical locations of the resources and the data path distances between the resources. The resource allocation data 238 describes the assignment of allocation of the resources to the various partitions 234-1 and 234-2. The history data 240 includes partition utilization history data, which describes the past or historical use of the resources by the partitions 234-1 and 234-2, and dynamic resource history data, which describes the changes of allocations of resources to partitions that have occurred in the past. The tool 242 recommends resource configurations and resource allocations, in order to improve performance of the computer system 100.

In an embodiment, the tool 242 and/or the hypervisor 244 include instructions capable of executing on the processor 101 or statements capable of being interpreted by instructions executing on the processor 101 to perform the functions as further described below with reference to FIGS. 8, 9, 10, 11, and 12. In another embodiment, the tool 242 and/or the hypervisor 244 may be implemented in microcode or firmware. In another embodiment, the tool 242 and/or the hypervisor 244 may be implemented in hardware via logic gates and/or other appropriate hardware techniques.

It should be understood that FIGS. 1 and 2 are intended to depict the representative major components of the computer system 100 at a high level, that individual components may have greater complexity than represented in FIGS. 1 and 2, that components other than or in addition to those shown in FIGS. 1 and 2 may be present, and that the number, type, and configuration of such components may vary. Several particular examples of such additional complexity or additional variations are disclosed herein; it being understood that these are by way of example only and are not necessarily the only such variations.

The various software components illustrated in FIG. 2 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media, which include, but are not limited to:

(1) information permanently stored on a non-rewriteable recordable storage medium, e.g., a read-only memory device attached to or within a computer system, such as a CD-ROM, DVD-R, or DVD+R;

(2) alterable information stored on a rewriteable recordable storage medium, e.g., a hard disk drive (e.g., the DASD 125 or 126), CD-RW, DVD-RW, DVD+RW, DVD-RAM, or diskette; or (3) information conveyed by a communications medium, such as through a computer or a telephone network, e.g., the network 130, including wireless communications.

Such tangible signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

FIG. 3 depicts a block diagram of an example data structure for resource configuration data 236, according to an embodiment of invention. The source configuration data 236 includes records 305, 310, 315, 320, 325, 330, 335, 340, 345, 350, 355, 360, 365, 370, 375, and 380, each of which includes a resource field 385, a location field 390, and a data path distance field 395. The resource field 385 identifies a resource in the computer system 100. Examples of resources include the processors 101, the memory 102, the interface devices 111, 112, 113, and 114, the storage devices 125 and 126, printers, fax machines, bandwidth of the network 130, an I/O (input/output) device, any other resource or device that is capable of being allocated (shared or exclusive) to a partition 234-1 or 234-2, or any portion, multiple, or combination, thereof. The location 390 identifies a location, site, or position within the computer system 100 where the resource is connected or mounted. In an embodiment, the location may specify a module, board, or card to which the resource is connected or mounted.

The data path distance field 395 specifies the distance that data transferred from the resource 385 specified by the record must travel to reach each other resource specified by other respective records in the resource configuration data 236. In an embodiment, the data path distance for each resource is based on, or is proportional to, the number of components on a data transfer path between the resources. For example, the processor 101C is directly connected to the memory 102A in the module 106-2, so the processor 101C is only one component away from the memory 102A. In contrast, the data transfer path between the processor 101C in the module 106-2 and the auxiliary device interface 113 is much longer and includes more components, such as the components of the MCM interconnect 107, the MCM 106-4, the I/O bus 104-2, the slot 120-8 and the auxiliary device interface 113 because data must pass through these components or be transferred by these components, as part of being transferred or sent between the processor 101C and the auxiliary device interface 113. In another embodiment, the data path distance is also based on, or weighted by, the performance of the components on the data path between the resources, and is inversely proportional to the speed of the components, so that slower components are represented by a longer data path distance, and faster components are represented by a shorter data path distance.

Thus, in an embodiment, the tool 242 calculates the data path distance between the locations of the resources based on a number of components or resources in the computer system 100 that data must flow through, in order to travel between the resources. In another embodiment, the tool 242 calculates the data path distance between the locations of the resources based on both the number of components or resources that the data must flow through and based on the performance characteristics of the components. Examples of performance characteristics include the speed, latency, or capacity of the components. Speed may be expressed in terms of instructions executed per unit of time, clock cycles, or amount of data transferred per unit of time. Capacity is the amount of data that may be stored, retrieved, accepted, or provided by the components. Latency is the delay that occurs before a component begins to transfer, accept, store, or provide data to/from another component or resource.

For example, if one component has a higher speed than other components, the tool 242 may decrease the distance or weight for that component. Or, if the component has a lower speed than other components, the tool 242 may increase the distance or weight for that component. The total distance for a data path is then the sum of all the weighted distances assigned to each component within the data path.

In the example record 305, the data path distance 395 for the resource 385 of the processor 101A is illustrated as "0, 1, 2, 2, 2, 2, 2, 2, 3, 1, 3, 1, 3, 5, 3, 5," which specifies that the processor 101A is a data path distance of "0" from itself, a data path distance of "1" from the processor 101B, a data path distance of "2" from the processor 101C, a data path distance of "2" from the processor 101D, a data path distance of "2"

from the memory 102A, a data path distance of "2" from the memory 102B, a data path distance of "2" from the memory 102C, a data path distance of "2" from the memory 102D, a data path distance of "3" from the terminal interface unit 111 connected to the slot 120-1 of the I/O bus 104-1, a data path distance of "1" from the slot 120-2 of the I/O bus 104-1, a data path distance of "3" from the storage interface unit 112 connected to the slot 120-3 of the I/O bus 104-1, a data path distance of "1" from the slot 120-4 of the I/O bus 104-1, a data path distance of "3" from the slot 120-5 of the I/O bus 104-2, a data path distance of "5" from the network interface unit 114 connected to the slot 120-6 of the I/O bus 104-2, a data path distance of "3" from the slot 120-7 of the I/O bus 104-2, and a data path distance of "5" from the auxiliary device interface unit 113 connected to the slot 120-8 of the I/O bus 104-2.

FIG. 4 depicts a block diagram of an example data structure for resource allocation data 238, according to an embodiment of invention. The resource allocation data 238 includes example records 405 and 410, each of which includes a logical partition identifier field 415, a rank field 420, an allocated resources field 425, and a location field 430. Each of the records 405 and 410 represents the resources 385 that are allocated to a partition and the location of those resources within the computer system 100. The logical partition identifier field 415 identifies a logical partition 234-1 or 234-2. The rank 420 represents a relative importance or priority of the respective partition 415 compared to other partitions, and is specified by a user. The allocated resources 425 specify the resources and optionally an amount of the resources in the computer system 100 that are allocated to the respective logical partition 415. A resource is allocated to a logical partition if the logical partition is capable of using the resource, is capable of transferring data to and/or from the resource, or if the resource is capable of doing work for, or on behalf of, the partition, on either a shared or exclusive basis. The location 430 identifies a location, site, or position within the computer system 100 where the resource 425 is connected or mounted. In an embodiment, the location 430 may specify a module, I/O bus, slot, card, or board to which the resource is connected or mounted, such as the MCM 106-1, 106-2, 106-3, or 106-4.

FIG. 5 depicts a block diagram of an example data structure for partition utilization history data 240-1, according to an embodiment of invention. The history data 240 (FIG. 2) includes the partition utilization history data 240-1. The partition utilization history data 240-1 includes example records 505 and 510, each of which includes a logical partition identifier field 515, a processor utilization field 520, a memory amount field 525, and an amount of data transferred between resources field 530. Each of the records 505 and 510 represents a history of the use of resources by the respective partition 234-1 or 234-2 identified by the logical partition identifier field 515. The processor utilization field 520 specifies the percentage amount of the processor capacity allocated to the partition 515 that was actually used by the partition 515 during a time period. In an embodiment, the utilization 520 may also identify the processors that are allocated to the partition 515 and the individual utilizations of the allocated processors. The memory amount field 525 identifies an amount or percentage of the memory 102A, 102B, 102C, or 102D allocated to the partition 515 that the partition 515 actually used during a time period. The amount of data transferred field 530 indicates the amount of data that was transferred during a time period between the resources that were allocated to the partition 515. The data transferred field 530 may indicate the individual resources that are allocated to the partition 515 and the amounts of data transferred for each of the allocated resources.

FIG. 6 depicts a block diagram of an example data structure for dynamic resource allocation history data 240-2, according to an embodiment of invention. The history data 240 (FIG. 2) includes the dynamic resource allocation history data 240-2. The dynamic resource allocation history data 240-2 includes example records 605, 610, and 612, each of which includes a resource field 615, a location field 620, a source partition identifier field 625, a destination partition identifier field 630, and a time field 635.

The resource field 615 identifies a respective resource in the computer system 100. The location field 620 identifies a respective location of the resource 615 within the computer system 100. The source partition identifier field 625 identifies a respective partition 234-1 or 234-2 from which the resource 615 was deallocated. The destination partition identifier field 630 identifies the partition 234-1 or 234-2 to which the resource 615 was allocated after being deallocated from the source partition 625. The time field 635 specifies the time of the change of the allocation from the source partition 625 to the destination partition 630. Thus, each of the records 605, 610, and 612 represents a deallocation of a respective resource 615 from the source partition 625 and then an allocation of the resource 615 to the respective destination partition 630 at the time 635.

Figure 7:
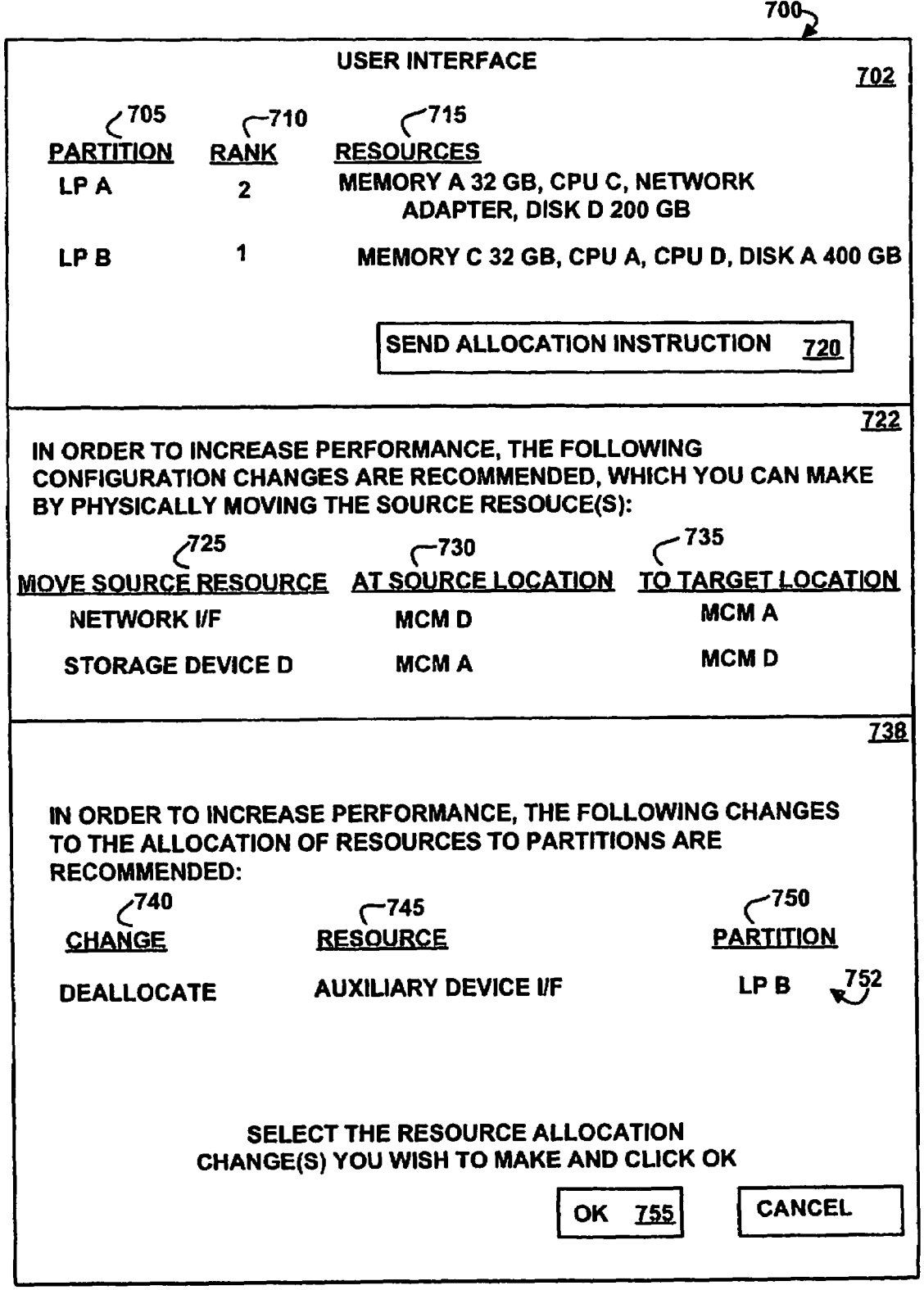
FIG. 7 depicts a block diagram of an example user interface, according to an embodiment of invention.

FIG. 7 depicts a block diagram of an example user interface 700, according to an embodiment of invention. The tool 242 presents the user interface 700 via the user terminal 121. The user interface 700 includes a specification of allocation instructions 702, and allows the user to send an allocation instruction 702 that specifies a partition 705, a rank 710, and resources 715 to the hypervisor 244. In response to user selection of the send allocation instruction button 720, the user interface 700 sends a specification of the resources 715, which may include amounts of the resources, specification of the rank 710 of the partitions, and a specification of the partitions 705, to the hypervisor 244.

In response to receipt of the allocation instruction, the hypervisor 244 allocates the specified resources 715 in the specified amounts to the respective partition 705. The hypervisor 244 further assigns the ranks 710 to the respective partitions 705. The rank 710 specifies the rank, priority, or importance of the partition 705 with respect to other partitions, and is used to prioritize the partitions when they contend for scarce resources. For example, a partition with a higher rank may be allocated resources that are closer to each other than partitions with a lower rank. That is, the hypervisor 244 allocates resources to partitions, so that the data path distances between the locations of the resources that are allocated to higher-ranking partitions are shorter than the data path distances between the locations of the resources that are allocated to lower-ranking partitions.

The user interface 700 further includes recommended changes 722 to the configuration of the resources within the computer system 100, in the form of a specification of source resources 725 that are recommended to be moved from the source locations 730 within the computer system 100 to the target locations 735 within the computer system 100. In response to the recommended configuration changes 722, the user may choose to physically move the resources within the computer system 100, or the user may choose to ignore some or all of the recommended configuration changes 722.

The user interface 700 further includes recommended allocation changes 738. The recommended allocation changes 738 may specify an allocate or deallocate change 740 for a specified resource 745 for a partition 750. In response to the recommended allocation changes 738, the user may select some or all of the recommended changes and send an allocation or deallocation instruction to the hypervisor 244 by selecting the button 755. For example, if the user selects the changes 752 and selects the button 755, the user interface 700 sends a deallocation instruction to the hypervisor 244 that requests the hypervisor 244 to deallocate the auxiliary device interface unit 113 from the partition 234-2. The user may also choose to ignore the recommended changes 738, in which case an instruction is not sent to the hypervisor 244.

Figure 8:
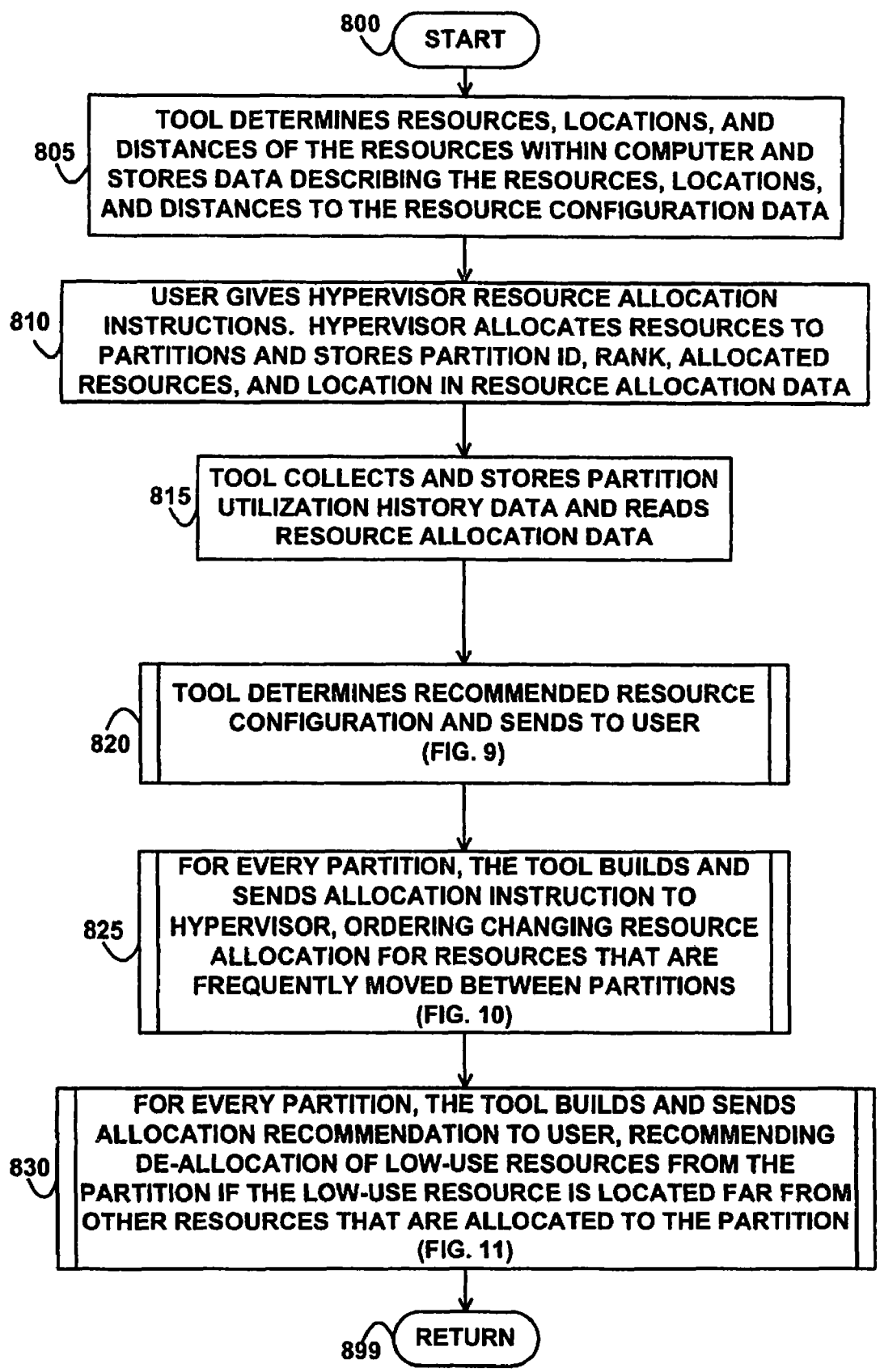
FIG. 8 depicts a flowchart of example processing for building and sending a recommended resource configuration, an allocation instruction, and an allocation recommendation, according to an embodiment of the invention.

FIG. 8 depicts a flowchart of example processing for building and sending a recommended resource configuration, an allocation instruction, and an allocation recommendation, according to an embodiment of the invention. Control begins at block 800. Control then continues to block 805 where the tool 242 determines the resources, the locations of the resources, and data path distances of the resources within the computer system 100 and stores data describing the resources, the locations of the resources, and the data path distances between the various resources into the resource configuration data 236.

Control then continues to block 810 where the user sends resource allocation instructions 702 to the hypervisor 244 via the user interface 700. The hypervisor 244 receives the resource allocation instructions and allocates the specified resources to the specified partitions and stores the partition identifier 415, the rank 420, the allocated resources 425, and the location 430 of the resources into the resource allocation data 238.

Control then continues to block 815 where the tool 242 collects and stores the partition utilization history data 240-1, including the logical partition identifier 515 for all of the active partitions, the processor utilization 520 for all of the processors in the computer system 100, the amount of memory used 525 by each of the partitions, and the amount of data transferred 530 between the resources allocated to the respective partitions. The tool 242 further reads the resource allocation data 238, including the logical partition identifier 415 for all the active partitions, the rank 420, the resources allocated 425 to the various partitions, and the location of the allocated resources 430.

Control then continues to block 820 where the tool 242 determines the recommended resource configuration 722 and sends the recommended resource configuration 722 to the user via the user interface 700, as further described below with reference to FIG. 9. Control then continues to block 825 where the tool 242, for every partition, builds and sends allocation instructions to the hypervisor 244, which instruct the hypervisor 244 to change the resource allocation for resources that have been frequently moved between partitions, as further described below with reference to FIG. 10.

Control then continues to block 830 where the tool 242, for every partition, builds and sends allocation recommendations to the user, recommending deallocation of low-use resources from the partitions, if the low-use resources are located far (on a data path) from other resources that are allocated to the partition, as further described below with reference to FIG. 11.

Control then continues to block 899 where the logic of FIG. 8 returns.

Figure 9:
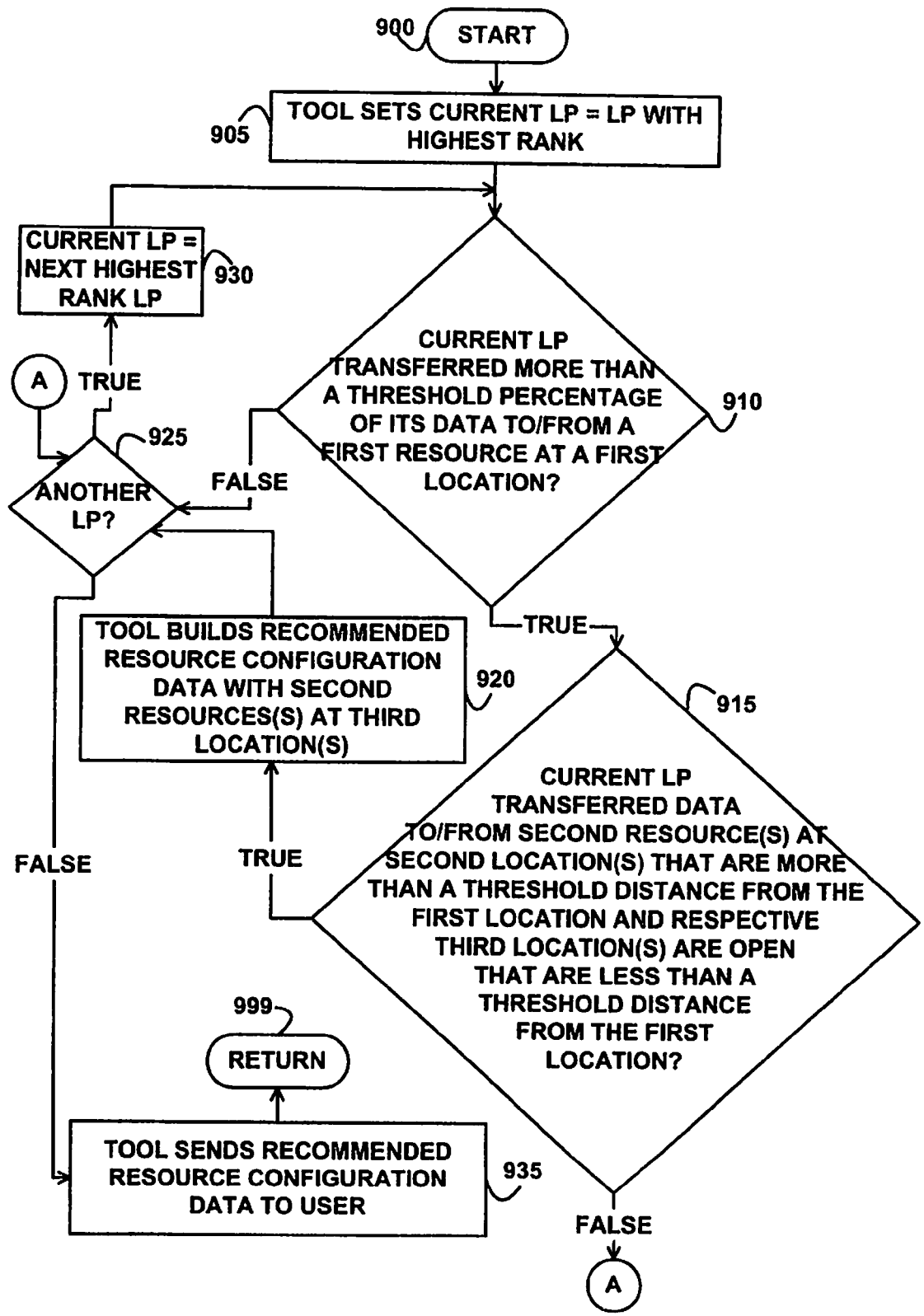
FIG. 9 depicts a flowchart of example processing for building and sending a recommended resource configuration, according to an embodiment of the invention.

FIG. 9 depicts a flowchart of example processing for building and sending a recommended resource configuration, according to an embodiment of the invention. Control begins at block 900. Control then continues to block 905 where the tool 242 sets the current logical partition to be the logical partition that has the rank 420 that is the highest rank, as compared to other partitions, meaning the partition that is the most important or the highest priority.

Control then continues to block 910 where the tool 242 determines whether the current partition in the computer system 100 has transferred more than a first threshold amount or percentage of data between the current partition and a first resource (allocated to the current partition) at a first location within the computer system 100. The tool 242 makes the determination at block 910 by finding the record in the partition utilization history data 240-1 with a logical partition identifier 515 that matches the logical partition identifier of the current partition and comparing the amount 530 of data transferred to/from various I/O devices to the first threshold amount or percentage of data. For example, if the current partition has a logical partition identifier of "LP A," then the current partition has transferred 86.5 GB (gigabytes) of data to/from the network resource and 14.5 GB to/from the "disk D" resource, as indicated in record 505. The network resource has a location of the "slot F" of the "MCM D," as indicated in the record 370 (FIG. 3), and the disk D resource has a location of slot C, "MCM A," as indicated in record 355 (FIG. 3). In various embodiments, the tool 242 may compare 86.5 GB and 14.5 GB to the first threshold amount or may compare 86.5/(86.5+14.5) and 14.5/(86.5+14.5) to the first threshold amount.

If the determination at block 910 is true, then the tool 242 has discovered that the current partition transferred more than a first threshold amount of data between the current partition and a first resource at a first location (allocated to the current partition) in the computer system 100, so control continues to block 915 where the tool 242 determines whether the current partition transferred more than a second threshold amount of the data between the current partition and any second resource(s) (allocated to the current partition) located at second location(s) within the computer system 100. Once again, using the example of record 505, if the network I/F 114 is the first resource, then the tool 242 makes the determination of block 915 by comparing 14.5 GB to the second threshold amount or by comparing 14.5/(86.5+14.5) to the second threshold amount.

The tool 242 further calculates first data path distance(s) between the first resource located at first location and the second resource(s) located at the second location(s) and determines whether any of the first data path distance(s) are more than a first threshold distance. The tool 242 further determines whether any third location(s) are open (a location is open if another resource is not mounted or connected to the location and the location is available for use). For example, records 350, 360, 365, and 375 all indicate that their respective locations are open and available for use because no resources are connected to slots B D, E, and G, of MCM A and D, respectively. The tool 242 further calculates second data path distance(s) between the first location and the third location(s) and determines whether any of the second data path distance(s) are less than a second threshold distance.

In an embodiment, the tool 242 calculates the data path distances based on a number of components in the computer system 100 that are between the resources at the locations on a data transfer path between the resources. In another embodiment, the tool 242 calculates the data path distance based on a number of components in the computer system 100 that are on a data transfer path between the locations and based on performance characteristics of the components. Components are between the resource locations on a data transfer path if data flows through the components when transferred between the resources at the locations, i.e., the components on the data transfer path are intermediate components that transfer the data. For example, as illustrated in FIG. 1, data that flows from the CPU 101A located at the MCM 106-1 to the memory 102D located at the MCM 106-4 flows on a data transfer path through the component MCM interconnect 107. Thus, the component MCM interconnect 107 is between the resources CPU 101A and the memory 102D, and the MCM interconnect 107 is on a data transfer path between the resources.

If the determination at block 915 is true, then the current partition transferred more than a second threshold amount of the data between the current partition and at least one second resource located at a second location, at least one of the first data path distances is more than a first threshold distance, at least one third location is open, and at least one second data path distance is less than a second threshold distance, so control continues to block 920 where the tool 242 builds the recommended resource configuration 722, which recommends moving the respective second resources (the source resource 725) at the respective second locations (the source location 730) to the respective third locations (the target location 735). Control then continues to block 925 where the tool 242 determines whether another logical partition exists that has not yet been processed by the logic of FIG. 9.

If the determination at block 925 is true, then another unprocessed logical partition does exist, so control continues to block 930 where the tool 242 sets the current logical partition to be the next highest ranking logical partition. Control then returns to block 910, as previously described above.

If the determination of block 925 is false, then all logical partitions have been processed by the logic of FIG. 9, so control continues to block 935 where the tool 242 sends the recommended resource configuration 722 to the user interface 700. Control then continues to block 999 where the logic of FIG. 9 returns.

If the determination at block 915 is false, then the current partition did not transfer more than a second threshold amount of the data between the current partition and at least one second resource, no first data path distances are more than a first threshold distance, no third locations are open, or no second data path distances are less than a second threshold distance, so control continues to block 925, as previously described above.

If the determination of block 910 is false, then the current partition has not transferred more than a first threshold amount or percentage of data between the current partition and a first resource in the computer system 100, so control continues to block 925, as previously described above.

In an embodiment, a genetic algorithm is used to determine an optimal recommended configuration. The genetic algorithm operates over a number of generations and randomly select two resources that could theoretically swap locations, or selects two resources whose assignments to two partitions could theoretically swap. For example, the locations of two I/O bus adapters could theoretically swap locations, the allocations of two processors to two different partitions could theoretically swap between the partitions, but a processor and an I/O adapter could not theoretically swap locations. The genetic algorithm then determines the efficiency of the configuration that results from the swap of the resources, and if the new configuration has better efficiency, the new configuration is retained; otherwise the previous configuration is retained. The genetic algorithm then proceeds to the next generation of combinations of theoretical swaps of resource locations or assignments. The genetic algorithm continues through generations until a selected number of generations have been modeled, and the genetic algorithm then picks the modeled configuration that had the best efficiency.

For determining efficiency, the genetic algorithm adds the data path distance between resources multiplied by a weight and selects the configuration with the lowest cumulative distance. In an embodiment, the weight is based on how often the resources communicate with each other, with frequently communicating devices having higher weights multiplied by the distances to their locations. This weighting technique causes, e.g., a low-use resource that is located on a different MCM from the rest of the resources allocated to the partition to have a better (lower) calculated efficiency than two high use resources that communicate often (e.g., a highly-utilized processor and memory) while far from each other on different MCMs. In another embodiment, other algorithms may be used, e.g., for small configurations an exhaustive algorithm that examines all possible locations of all possible resources may be use to determine the best configuration.

Figure 10:
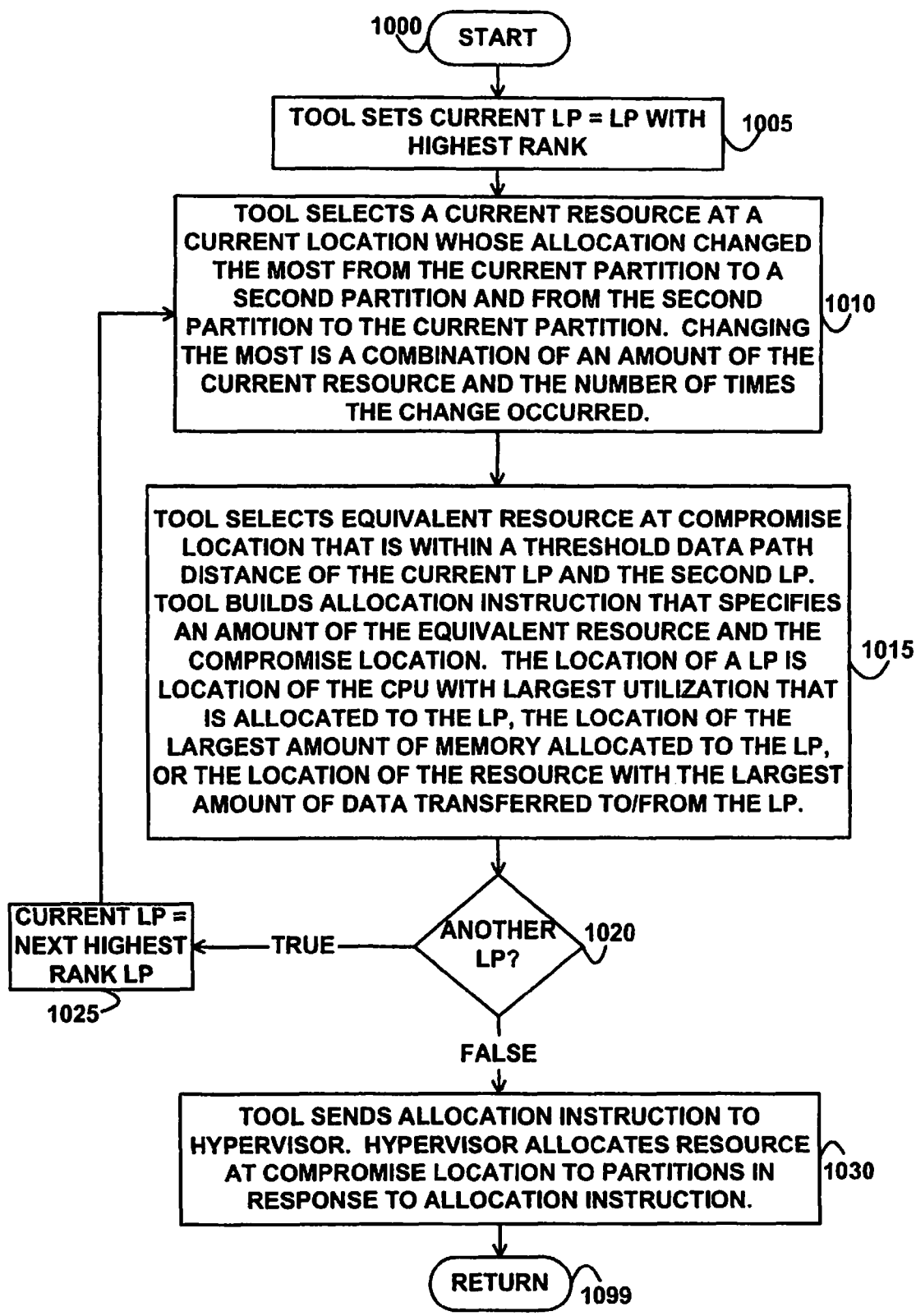
FIG. 10 depicts a flowchart of example processing for building and sending an allocation instruction, according to an embodiment of the invention.

FIG. 10 depicts a flowchart of example processing for building and sending an allocation instruction, according to an embodiment of the invention. Control begins at block 1000. Control then continues to block 1005 where the tool 242 sets the current logical partition to be the logical partition with the highest rank 420, as compared to other partitions in the computer system 100.

Control then continues to block 1010 where the tool 242 selects a current resource at a current location whose allocation was changed in the past (by the hypervisor 244) from a current partition to a second partition and from the second partition to the current partition more than a calculated threshold amount. That is, at a time (the time 635 in a record where the current resource matches the resource 615) in the past, the hypervisor 244 deallocated the current resource from the current partition (the current partition matches the source partition 625) and allocated the current resource to the second partition (the second partition matches the destination partition 630 in the record). Further, at another time (the time 635 in another record where the current resource matches the resource 615) in the past, the hypervisor 244 also deallocated the current resource from the second partition and allocated the current resource to the current partition (in the record, the second partition matches the source partition 625 and the current partition matches the destination partition 630). In an embodiment, the number of times that a resource is allocated and deallocated between partitions and the calculated threshold amount is weighted based on one or both of the amount of the resource and the number of times that the resource was allocated and then deallocated. For example, as illustrated in FIG. 6, the resource of 16 GB of memory located at the MCM D 106-4 had its allocation moved (deallocated and then allocated) from logical partition LP B to LP A, as indicated in the record 612, and also had its allocation moved (deallocated and then allocated) from the logical partition LP A to LP B, as indicated in the record 605. Thus, the resource had its allocation changed twice between the current partition and the second partition, and the amount of the resource is 16 GB, so applying the weighted factor, 2*16 GB=32 GB, so the tool 242 compares 32 GB against the threshold when making the determination of block 1010.

In an embodiment, the tool 242 calculates the threshold amount to be the amount of allocation change for the second most-changed resource. That is, the tool 242 selects the current resource whose allocation changed the most between the current partition and the second partition (the current resource whose allocation was swapped the most between the current partition and the second partition), as compared to other resources whose allocations were swapped between the current partition and the second partition.

Control then continues to block 1015 where the tool 242 selects an equivalent resource at a compromise location, where the compromise location is within a third threshold data path distance of a partition location of the current partition and of a partition location of the second partition. The tool 242 selects an equivalent resource that has an equivalent or identical type as the current resource. For example, if the current resource is memory (has a type of memory), the tool 242 selects the equivalent resource that is also memory; if the current resource is a processor (has a type of processor), then the tool 242 selects the equivalent resource that is also a processor. The tool 242 further selects the equivalent resource that has an identical or greater capacity or amount as the current resource. For example, if the current resource has an amount of 16 GB, then the tool 242 selects an equivalent resource that has an amount or capacity that is greater than or equal to 16 GB. The equivalent resource is different from the current resource in that the equivalent resource is located at a different location in the computer system 100, that is, the compromise location of the equivalent resource is different from the current location of the current resource.

In an embodiment, the partition location of the current partition is the location of a processor that has the highest utilization of all the processors that are allocated to the current partition. In another embodiment, the partition location of the current partition is the location of the module on which the largest amount of memory that is allocated to the current partition is mounted. In another embodiment, the partition location of the current partition is the location of the resource that is allocated to the current partition that transferred a largest amount of data in a time period, when compared to all other resources that are allocated to the current partition. The tool 242 builds an allocation instruction that specifies the selected equivalent resource and specifies the amount of the selected equivalent resource that has been allocated to the current logical partition and to the second logical partition.

Control then continues to block 1020 where the tool 242 determines whether another logical partition exists that has not been processed by the logic of FIG. 10. If the determination at block 1020 is true, then another logical partition exists that remains to be processed by the logic of FIG. 10, so control continues to block 1025 where the tool 242 sets the current logical partition to be the logical partition with the next highest rank. Control then returns to block 1010, as previously described above.

If the determination at block 1020 is false, then all of the logical partitions in the computer system 100 have been processed by the logic of FIG. 10, so control continues to block 1030 where the tool 242 sends the allocation instruction(s) to the hypervisor 244. The hypervisor 244 allocates the equivalent resources specified in the allocation instruction(s) at the compromise location to the current partitions in response to the allocation instruction, instead of the current resource at the current location. Control then continues to block 1099 where the logic of FIG. 10 returns.

Figure 11:
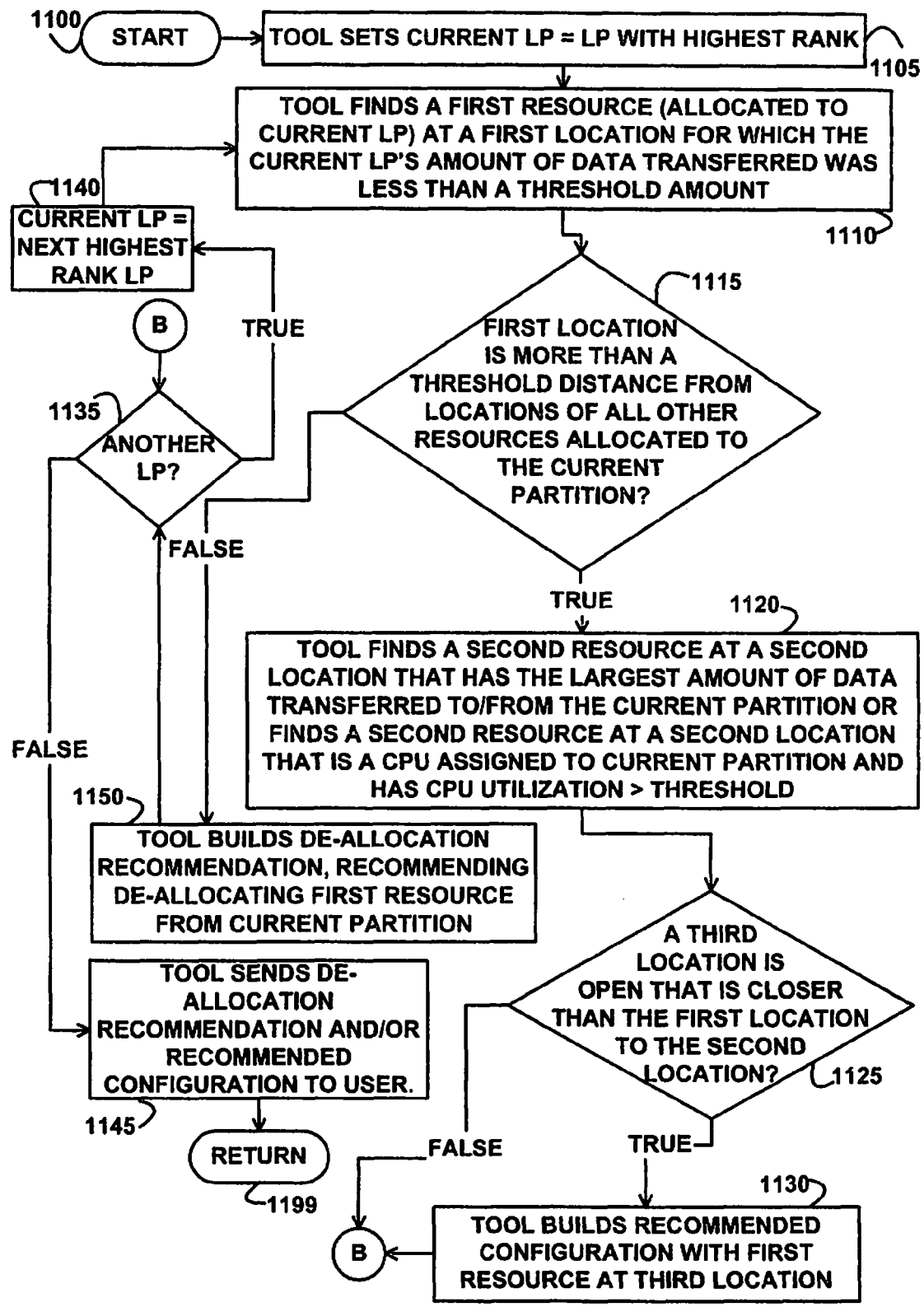
FIG. 11 depicts a flowchart of example processing for building and sending an allocation recommendation, according to an embodiment of the invention.

FIG. 11 depicts a flowchart of example processing for building and sending an allocation recommendation, according to an embodiment of the invention. Control begins at block 1100. Control then continues to block 1105 where the tool 242 sets the current logical partition to be the logical partition in the computer system 100 with the highest rank. Control then continues to block 1110 where the tool 242 discovers a first resource at a first location that is allocated to the current partition. The tool 242 further discovers that the current partition transferred a first amount of data to the first resource, and the first amount of data is less than a threshold amount of data.

Control then continues to block 1115 where the tool 242 determines whether the first location is more than a threshold distance (on data transfer paths) from locations of all other resources that are allocated to the current partition. That is, the tool 242 determines whether all of the data path distances between the first location and locations of all other resources allocated to the current partition are more than a threshold distance.

If the determination of block 1115 is true, then all of the data path distances between the first location and locations of all other resources allocated to the current partition are more than a threshold distance, so control continues to block 1120 where the tool 242 finds a second resource (allocated to the current partition) at a second location that has the largest amount 530 of data transferred between (to and/or from) the current partition (as compared to other resources allocated to the current partition), or the tool 242 finds a second resource in the second location where the second resource is a processor that is allocated to the current partition and that processor has a utilization 520 that is greater than a utilization threshold.

Control then continues to block 1125 where the tool 242 determines whether a third location is open that is closer to the second location than the first location is to the second location. That is, the tool 242 determines whether the third location is free or is not currently connected to a resource and determines whether a data path distance from the third location to the second location is less than a data path distance from the first location to the second location.

If the determination at block 1125 is true, then a third location is open in the computer system 100 and the third location is closer to the second location than the first location is to the second location, so control continues to block 1130 where the tool 242 builds a recommendation configuration that recommends moving the first resource to the third location. Control then continues to block 1135 where the tool 242 determines whether another logical partition exists that has not yet been processed by the logic of FIG. 11. If the determination at block 1135 is true, then another unprocessed logical partition does exist, so control continues to block 1140 where the tool 242 sets the current logical partition to be the next unprocessed logical partition that is next highest in rank. Control then returns to block 1110, as previously described above.

If the determination of block 1135 is false, then all logical partitions have been processed by the logic of FIG. 11, so control continues to block 1145 where the tool 242 sends the recommended configuration 722 (if it exists) that recommends moving the first resource (the source resource 725) from the first location (the source location 730) to the third location (the target location 735) to the user interface 700. Control then continues to block 1199 where the logic of FIG. 11 returns.

If the determination of block 1125 is false, then a third location in the computer system 100 is not open or any locations in the computer system 100 that are open are not closer to the second location than is the first location, so control continues to block 1135, as previously described above.

If the determination of block 1115 is false, then the first location is not more than a threshold data path distance from all other locations of all other resources that are allocated to the current partition, that is, all of the data path distances between the first location and locations of all other resources allocated to the current partition are not more than a threshold distance, so control continues to block 1150 where the tool 242 builds a deallocation recommendation, recommending that the first resource be deallocated from the current partition. Control then continues to block 1135 where the tool 242 determines whether another logical partition exists that has not yet been processed by the logic of FIG. 11. If the determination of block 1135 is true, then another logical partition does exist, so control continues to block 1140, as previously described above.

If the determination of block 1135 is false, then all logical partitions have been processed by the logic of FIG. 11, so control continues to block 1145 where the tool 242 sends the deallocation recommendation 738 and the recommended configuration, if it exists, to the user interface 700. Control then continues to block 1199 where the logic of FIG. 11 returns.

Figure 12:
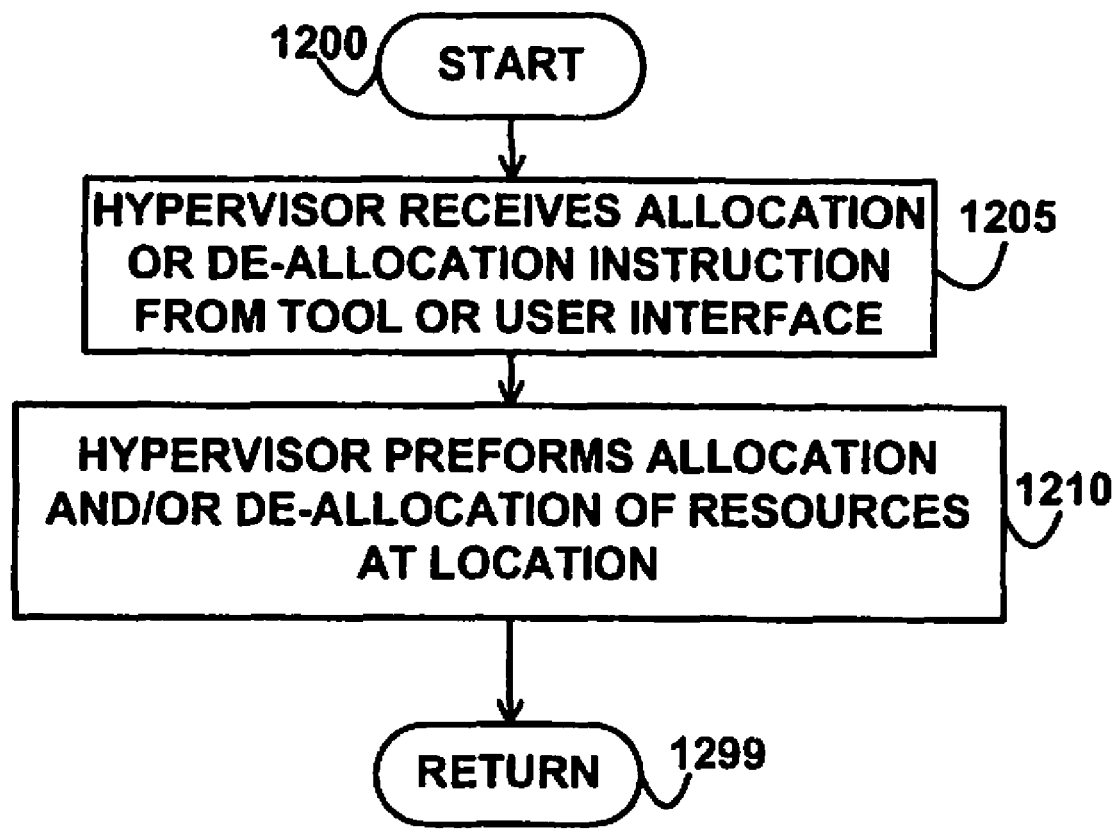
FIG. 12 depicts a flowchart of example processing for performing allocation instructions, according to an embodiment of the invention.

FIG. 12 depicts a flowchart of example processing for performing allocation and deallocation instructions, according to an embodiment of the invention. Control begins at block 1200. Control then continues to block 1205 where the hypervisor 244 receives an allocation or deallocation instruction from the tool 242 or from the user interface 700. Control then continues to block 1210 where the hypervisor 244 performs the allocation or the deallocation of the specified resources at the specified locations to/from the specified partition in the computer system 100. Control then continues to block 1299 where the logic of FIG. 12 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
    determining that a first partition in a logically-partitioned computer system transferred more than a first threshold amount of data between the first partition and a first resource at a first location;
    determining that the first partition transferred more than a second threshold amount of the data between the first partition and a second resource at a second location;
    calculating that a first data path distance between the first location and the second location is more than a first threshold distance;
    computing that a third location is open and that a second data path distance between the first location and the third location is less than a second threshold distance;
    recommending movement the second resource to the third location in response to the determining that the first partition in the logically-partitioned computer system transferred more than the first threshold amount of the data, the determining that the first partition transferred more than the second threshold amount of the data, the calculating that a first data path distance between the first location and the second location is more that a first threshold distance, and the computing that a third location is open and that a second data path distance between the first location and the third location is less than a second threshold distance;
    selecting a current resource at a current location whose allocation was changed from a current partition to a second partition and from the second partition to the current partition more than a threshold amount; and
    selecting an equivalent resource at a compromise location, wherein the compromise location is within a third threshold distance of a partition location of the current partition and of a partition location of the second partition.

2. The method of claim 1, wherein the calculating further comprises:
    calculating the first data path distance based on a number of components in the computer system that are between the first location and the second location.

3. The method of claim 1, further comprising:
    allocating the equivalent resource to the current partition instead of the current resource.

4. The method of claim 1, wherein the partition location of the current partition comprises a location of a processor that is allocated to the current partition, wherein the processor has a higher utilization than all other processors allocated to the current partition.

5. The method of claim 1, wherein the partition location of the current partition comprises a location of a module comprising an amount of memory that is allocated to the current partition, wherein the amount of the memory is larger than all other amounts of memory allocated to the current partition from other modules.

6. The method of claim 1, wherein the partition location of the current partition comprises a location of a resource allocated to the current partition that transferred a larger amount of data than all other resources allocated to the current partition.

7. A non-transitory storage medium encoded with instructions, wherein the instructions when executed comprise:
    determining that a first resource at a first location is allocated to a current partition in partition in a computer system and the current partition transferred a first amount of data to the first resource that is less than a threshold amount;
    finding a second resource at a second location, wherein the second resource is allocated to the current partition, wherein the finding the second resource at the second location further comprises determining that the second resource has a larger amount of data transferred between the second resource and the current partition than a plurality of amounts of data transferred between the current partition and other resources that are allocated to the current partition;
    deciding that a third location is open and that a data path distance from the third location to the second location is less than a data path distance from the first location to the second location; and
    making a recommendation for the first resource based on a plurality of data path distances between the first location and locations of all the other resources allocated to the current partition.

8. The non-transitory storage medium of claim 7, wherein the finding the second resource at the second location further comprises:
   determining that the second resource is a processor that has a utilization that is greater than a utilization threshold.

9. The non-transitory storage medium of claim 7, wherein the making the recommendation further comprises:
   if the plurality of data path distances between the first location and the locations of the other resources allocated to the current partition are more than a threshold distance, recommending moving the first resource to the third location.

10. The non-transitory storage medium of claim 7, wherein the making the recommendation further comprises:
   if the plurality of data path distances between the first location and the locations of the other resources allocated to the current partition are not more than a threshold distance, recommending deallocating the first resource from the current partition.

11. A computer system comprising:
   a processor; and memory connected to the processor, wherein the memory encodes instructions that when executed by the processor comprise:
   determining that a first partition in a logically-partitioned computer system transferred more than a first threshold amount of data between the first partition and a first resource at a first location,
   determining that the first partition transferred more than a second threshold amount of the data between the first partition and a second resource at a second location,
   calculating that a first data path distance between the first location and the second location is more than a first threshold distance,
   computing that a third location is open and that a second data path distance between the first location and the third location is less than a second threshold distance,
   recommending movement of the second resource to the third location in response to the determining that the first partition in the logically-partitioned computer system transferred more than the first threshold amount of the data, the determining that the first partition transferred more than the second threshold amount of the data, the calculating that a first data path distance between the first location and the second location is more that a first threshold distance, and the computing that a third location is open and that a second data path distance between the first location and the third location is less than a second threshold distance;
   selecting a current resource at a current location whose allocation was changed from a current partition to a second partition and from the second partition to the current partition more than a threshold amount, and
   selecting an equivalent resource at a compromise location, wherein the compromise location is within a third threshold distance of a partition location of the current partition and of a partition location of the second partition.

12. The computer system of claim 11, wherein the calculating further comprises:
   calculating the first data path distance based on a number of components in the computer system that are between the first location and the second location.

13. The computer system of claim 11, wherein the instructions further comprise:
   allocating the equivalent resource to the current partition instead of the current resource.

14. The computer system of claim 11, wherein the partition location of the current partition comprises a location of a processor that is allocated to the current partition, wherein the processor has a higher utilization than all other processors allocated to the current partition.

15. The computer system of claim 11, wherein the partition location of the current partition comprises a location of a module comprising an amount of memory that is allocated to the current partition, wherein the amount of the memory is larger than all other amounts of memory allocated to the current partition from other modules.

* * * * *